(12) United States Patent
Allen et al.

(10) Patent No.: US 7,325,757 B2
(45) Date of Patent: Feb. 5, 2008

(54) PLASTICS RECOVERY SYSTEM

(75) Inventors: Paul C. Allen, El Cerrito, CA (US);
Laurence E. Allen, III., San Rafael, CA (US)

(73) Assignee: MBA Polymers, Inc., Richmond, CA (US)

( * ) Notice: Subject to any disclaimer, the term of this patent is extended or adjusted under 35 U.S.C. 154(b) by 62 days.

(21) Appl. No.: 10/775,665

(22) Filed: Feb. 9, 2004

(65) Prior Publication Data

US 2004/0159593 A1 Aug. 19, 2004

Related U.S. Application Data

(63) Continuation of application No. PCT/US03/22921, filed on Jul. 22, 2003.

(60) Provisional application No. 60/397,953, filed on Jul. 22, 2002.

(51) Int. Cl.
*B02C 19/00* (2006.01)

(52) U.S. Cl. .................. 241/19; 241/24.14; 241/24.17; 241/24.18; 241/60; 241/34; 241/36; 241/77; 241/79.1; 241/81; 241/101.741; 241/101.76

(58) Field of Classification Search ............. 241/24.18, 241/79.1, 101.741, 101.74, 24.1, 19, 77, 241/81, 24.14, 60, 24.17, 34, 36, 101.76; 209/138, 139.1, 3, 37
See application file for complete search history.

(56) References Cited

U.S. PATENT DOCUMENTS

| | | | |
|---|---|---|---|
| 3,885,744 A * | 5/1975 | Drage | 241/23 |
| 4,015,546 A * | 4/1977 | Paules | 110/187 |
| 4,034,862 A * | 7/1977 | Bahri et al. | 209/11 |
| 4,083,499 A | 4/1978 | Thatcher | |
| 4,127,476 A * | 11/1978 | Iannazzi | 209/3 |
| 4,264,352 A * | 4/1981 | Houser | 71/9 |
| 5,043,005 A | 8/1991 | Keller et al. | |
| 5,103,981 A * | 4/1992 | Abbott et al. | 209/37 |
| 5,788,167 A * | 8/1998 | Chapman | 241/19 |
| 5,842,652 A | 12/1998 | Warsing | |
| 2004/0004033 A1 | 1/2004 | Vandeputte | |
| 2006/0102524 A1 | 5/2006 | DeFeraudy | |

FOREIGN PATENT DOCUMENTS

WO    WO 01/81058    11/2001

OTHER PUBLICATIONS

International Search Report, International Application Serial No. PCT/US03/22921, Jul. 25, 2005, 3 pp.

* cited by examiner

*Primary Examiner*—Mark Rosenbaum
(74) *Attorney, Agent, or Firm*—Fish & Richardson P.C.

(57) ABSTRACT

A transportable system for separating materials in a waste stream. An arrangement of separation and grinding devices is mounted on a transportable platform. The devices are configured and arranged to produce three or more product streams from a plastic-rich feed mixture. One of the product streams is a coarse heavy stream, one stream is a ground plastic-rich product stream, and one stream is a ground light material stream. The system can be transported to a waste-goods location, operated to separate waste-goods, and relocated a new location.

24 Claims, 5 Drawing Sheets

PLASTICS RECOVERY SYSTEM

CROSS-REFERENCE TO RELATED APPLICATIONS

This application is a continuation of International Application No. US03/22921, filed Jul. 22, 2003, which claims priority to U.S. Provisional Application No. 60/397,953, filed Jul. 22, 2002, which are incorporated by reference herein.

TECHNICAL FIELD

This invention relates to recycling plastics, metals and other materials.

BACKGROUND

By generating over 36 million metric tons (MT) of material and $270 billion of production per year, and being responsible for approximately 3.2 million jobs, plastics and related businesses represent the fourth largest industry in the United States, according to "Plastics in the USA", Society of Plastics Industry, Washington, D.C. Unlike other material industries, such as steel and aluminum, however, this industry depends almost solely on nonrenewable raw material, mostly imported petroleum. This dependence becomes even more significant as the growth rate of plastics continues to outpace that of all other materials.

Most of the plastic supplied by today's manufacturers ends its life in landfills or incinerators simply because the technology has not been available to recover it economically. The Environmental Protection Agency (EPA) estimates that the amount of plastic in municipal solid waste (MSW) grew from less than 1 million MT before 1960 to over 20 million MT's by 2000.

Durable goods such as automobiles, appliances and electronic equipment account for about one-third of the plastics in MSW. Durable goods are increasingly being collected and partially recycled at the end of their useful lives to avoid disposal costs and potential liabilities, and to recover metals and other marketable raw materials. Take-back and producer-responsibility legislation is also growing.

The recovery of plastics from durable goods requires a plastic-rich raw material. Automobiles, appliances and electronics generally contain more metal than plastic (typically plastic content is less than 30%), so a metal recovery operation must precede plastic recovery. Most metal recovery operations shred equipment in order to cost-effectively liberate metal from whole parts. A large-scale plastic recovery operation must be able to source this plastic-rich raw material from a number of metal recovery operations.

In order to create high value products from this plastic-rich raw material, the plastic recycling process must be able to separate highly mixed streams. The separation must be done on a flake-by-flake basis in order to achieve high throughput rates of products with acceptable purity. (see J. Brandrup, *Recycling and Recovery of Plastics*, Carl Hanser Verlag, New York, 1996 and D. F. Arola, L. Allen, and M. B. Biddle, "Evaluation of Mechanical Recycling Options for Electronic Equipment", IEEE Proceedings, May 11-13, 1999, Danvers, Mass.)

One of the significant obstacles to cost effective recovery of the plastic from waste durable goods is processing the plastic-rich raw material from a metal recovery operation such that it can be economically transported to a plastics recovery facility. In addition to plastic-rich raw materials, many waste streams contain significant amounts of metal, fluff, foam, fines, wood and paper that are not economical to ship to plastic recycling facilities since they are not generally target products. Moreover, since the plastics-rich raw material is typically a shredded material, the particle size can be too large to achieve the high bulk density necessary for economical transport. In addition, some of the metal found in the plastic-rich raw material can often be large enough to damage some types of size reduction equipment.

There are many devices available for reducing the size of waste materials including granulators, shredders, grinders, roll mills, knife mills and others. These devices vary in effectiveness based on the material being reduced. Some devices can deal with a significant fraction of metal in the feedstock, but these are general very high horsepower devices.

There are also several techniques for removal of metal from non-metals. These include magnets, metal detectors, eddy current devices and air aspirators.

A number of techniques also exist for the removal of fluff, foam, fines and paper from plastic-rich streams. Such devices include air aspirators, roll sorters, vacuum gravity tables and other devices.

SUMMARY

The present invention provides a transportable plastics-recovery system that includes separation and grinding devices arranged to enable recovering plastic from durable goods.

In general, in one aspect, the invention features methods and systems for providing a transportable system for separating materials in a waste stream. An arrangement of separation and grinding devices are mounted on a transportable platform. The devices are configured and arranged to produce three or more product streams from a plastic-rich feed mixture. One of the product streams is a coarse heavy stream, one stream is a ground plastic-rich product stream, and one stream is a ground light material stream.

Particular implementations can include one or more of the following features. The arrangement can include an air separator for separating metal materials from the plastic-rich mixture, and a grinder in operable communication with the air separator such that at least a portion of a material exiting the separator enters the grinder. The system can include a second separator mounted on the transportable platform in operable communication with the grinder. The second separator can be configured to receive a ground material stream from the grinder and to separate at least one ground light material stream from the ground material stream. The second separator can use air to separate a light fraction. The system can include an auger or feeder configured to receive a product stream from the air separator, the grinder or the second separator. The system can include one or more fans configured to push or pull material through the system. The platform can be included in an enclosure housing the arrangement. The platform can be included in a shipping container, a truck trailer, or a railroad car.

In another aspect, the invention features methods and systems for processing a plastic-rich mixture. A transportable separation system including an arrangement of separation and grinding devices mounted on a transportable platform is delivered to a waste-goods location. The system is operated to process a plastic rich-feed mixture to produce at least three product streams, the product streams including a coarse heavy stream, a ground plastic-rich product stream, and at least one ground light material stream. The system is then removed from the waste-goods location. In particular implementations, the devices of the system can remain mounted on the transportable platform throughout the delivering, operating and removing steps. The method can include transporting the ground plastic-rich product stream to a plastic recovery facility.

In one embodiment, the invention provides a transportable plastics-recovery system including an arrangement of separation and grinding devices, mounted on a transportable platform, for recovering plastic from a waste stream. Plastic-rich material is fed into a system with a feeder that first removes problematic metal contamination by air aspiration. The plastic-enriched product is then transferred by an auger to a grinder that reduces the material in size such that it can pass through a screen that is somewhere between 10 and 60 mm. The ground material is then sent through an air aspiration process to remove fluff, fines, paper, wood and other light materials. A fan can provide the suction for the air aspiration device. The bulk density of the final product is increased while also increasing the yield of desirable plastic materials. The densified plastic product can then be cost-effectively shipped to a central plastic recovery facility.

The invention can be implemented to provide one or more of the following advantages. The system is sized so that the arrangement of devices is compact enough to be relocated easily to adjust to changing waste-goods locations—for example, it can be sized to ship on a standard container, so that the system can be easily transported by road, rail or water. The whole system is easily shipped as a complete unit. Since a single waste-goods location will often be large enough to source the system for only a short period, when the supply of plastic-rich waste material at one location is exhausted, the system can be moved to a new source location, even remote areas with minimal facilities. Easy, fast and economical setup of the system enables quick turn-around of the system.

The small, containerized design reduces noise, vibration, and dust generation. These features make the system flexible for easy movement and installation and mitigate environmental health and safety issues by reducing the impact on the environment where it is used. This makes permitting for operation much easier, increasing the effective mobility of the system. The system can be advantageously located at a metal recovery facility that generates plastic-rich waste or byproducts of an average particle size from 10 mm to 200 mm.

Because the system removes non-target materials, it is generally more economical to ship the desired products instead of the raw mixed materials. Excessive metal contamination and low bulk density due to coarse particle size and excessive fluff content can be avoided. A ground product can be enriched in certain varieties of plastics, since certain materials separate differently in an aspirator. Separation of metal-enriched byproducts at the metal recovery facility avoids the cost of shipping those materials multiple times.

The details of one or more embodiments of the invention are set forth in the accompanying drawings and the description below. Unless otherwise defined, all technical and scientific terms used herein have the meaning commonly understood by one of ordinary skill in the art to which this invention belongs. All publications, patent applications, patents, and other references mentioned herein are incorporated by reference in their entirety. In case of conflict, the present specification, including definitions, will control. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
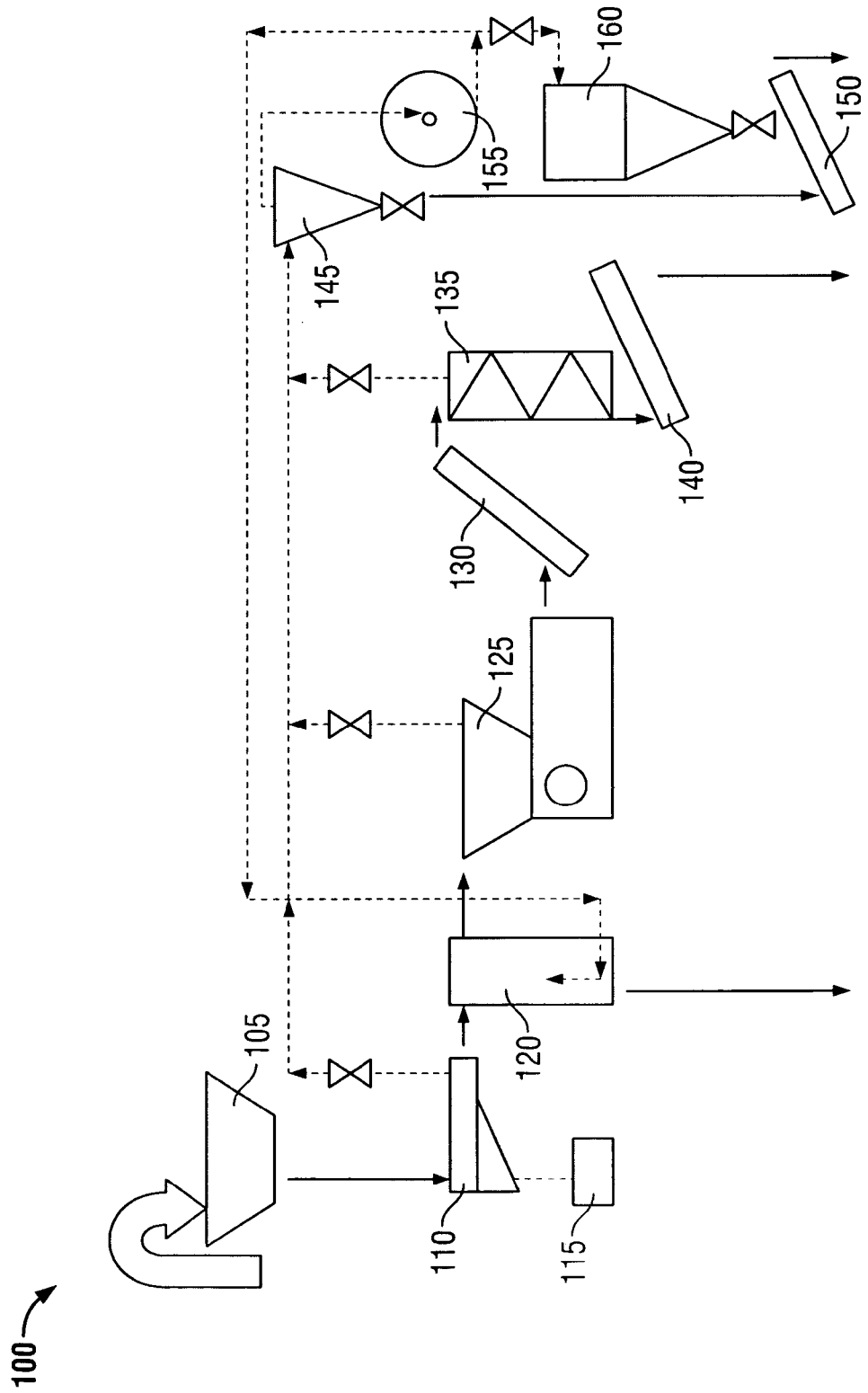
FIG. 1 shows a schematic of one implementation of the equipment configuration used in a transportable material separation system.

Collection sites for plastic containing products are not always close or convenient to a mixed material recovery facility, making transportation of the material to the recovery facility either unfeasible or prohibitively expensive. However, the alternative, disposing of the materials, is undesirable for environmental, economical, and space-related reasons. The invention provides techniques and apparatus whereby, instead of transporting both the desired and undesired materials to the recovery facility, a portion of the plastic recovery facility can be brought to the materials to recover only the desired target materials.

An arrangement including a plurality of separation devices is mounted, either permanently or removably, on a platform that can be readily transported from one site to another. The platform can be the base of a truck trailer, the base of a shipping container, the base of a railroad car, or another platform that can be easily loaded onto or into any of these transportable units. The separation devices are securely fastened to the platform during transport to avoid any safety hazards or equipment damage. The particular separation devices included in the arrangement can vary, and can be selected based on the goals of the off-site separation. The system may be enclosed to reduce noise and vibration. Enclosing the system also controls dust. In another embodiment the system can be open for easy maintenance.

A plastic recovery facility can include a number of different types of recycling equipment that are selected for processing mixed materials based on the composition of the mixture. In one embodiment, a system according to one aspect of the invention includes an initial separator, a grinder, and one or more secondary separators. Plastic-rich material is fed into the first separator, which removes metal contaminants by air aspiration. The plastic-enriched product is then transferred to a grinder that reduces the material in size. The ground material is then sent through an air aspiration process to remove fluff, fines, paper, wood and other light materials.

Plastic separation processes often begin by liberating metals from the mixture. By removing the metals at the site where the mixed materials are collected, a portion of the mixture (much of the metals) need not be handled, stored, and transported to the plastic recovery facility. The metal can be separated from the plastic using an air separator. The air separator can be an air-leg separator, which is a single stage device that passes feed material into a rising column of air, or a vibratory deck with air rising through holes in the deck, or a separator which exposes the feed to a rising current of air. This air separator can be tuned to entrain the lighter components of the feed and allow heavier components to fall to a catch chamber or auger. The rising column of air can be created by air blown in an upward direction or by use of suction or air recirculation.

The air-leg can be used to remove metals that damage the grinder, as well as plastics that are not intended for recovery at a plastic recovery facility. These heavy materials can be removed with an auger and are then available for reprocessing and metal recovery.

The entrained product from the air-leg can be deposited directly into a grinding chamber, such as a rotary grinder manufactured by Retech—Vecoplan of High Point, N.C., or plastic granulators manufactured by Herbold Meckesheim, GmbH, Meckesheim Germany. Some light, fine or foam material can remain entrained in the air stream and thus can be removed from the material to be ground. This is possible because the grinding chamber itself can act to selectively classify the plastic from the very light material.

The grinding stage can be followed by a variety of different processes. For example, a second air aspirator can be used remove foam, fluff and fines from the mixture. A cyclone can also be used for light material removal. Various augers and feeders can be used to move the material from one stage of the separation to another, and valves, diverters, gates and airlocks can be used to separate the results of one portion of the recovery process from another. A fan can be used to push or pull material through the system. The same fan, or a dedicated fan, can be used to collect dust liberated by the process to maintain cleanliness. The system can additionally include a small air compressor to assist in maintenance and clean-up and to provide bursts of air to clean the filters of the dust collector. Various bags, collectors and bins can be used to receive the results of the separation.

The various devices and processes can be automatically monitored and controlled. For example, the air pressures and amperage on the fan and grinder can be monitored. The system can be configured to include a computerized control system to adjust feed, grinding and fan rates. The positions of the various valves can also be adjusted. The computerized control system can be used to remotely monitor machine use, such as hours of use, to inform an operator when maintenance is required and how long the equipment has been run. The system can also be configured to provide helpful information to diagnose problems.

The product from the system can be blown by a pneumatic conveyance to a bulk-loading vessel. This vessel may be a large shipping container, a silo or a box or bag filling station. If a large shipping vessel is used, it can further reduce the cost of transporting the product by eliminating packaging. If the product is conveyed to a bulk loading vessel, a pneumatic conveyance system can be included such as that sold by Fox Valve Development Corp., Dover, N.J.

One implementation of the equipment configuration used in a transportable material separation system 100 is shown in FIG. 1. The mixed material is fed into hopper receiver 105 and is meter fed using feeder 110 controlled by a variable frequency drive 115 into air aspirator 120. The metal and waste reports out the bottom of air aspirator 120 while the light plastic-rich fraction floats in the rising column of air and reports to grinder 125. Grinder 125 reduces the size of the material to a more uniform size of approximately one-inch square. Grinder 125 can be a single shaft rotary grinder that contains removable teeth inserts, a screen and a ram, such as that manufactured by Vecoplan of High Point, N.C., or other suitable grinder.

The ground product is removed from grinder 125 and delivered with auger 130 to air aspiration device 135. Device 135 is tuned to remove waste, foam, fluff and fines from the desired plastic-rich product material. The product drops directly through aspirator 135 and into product delivery auger 140. The lights product, including any trapped dust that was picked up at the feeder and grinder, is delivered to cyclone 145 under negative pressure where cyclone 145 drops out the larger light particles.

Figure 2:
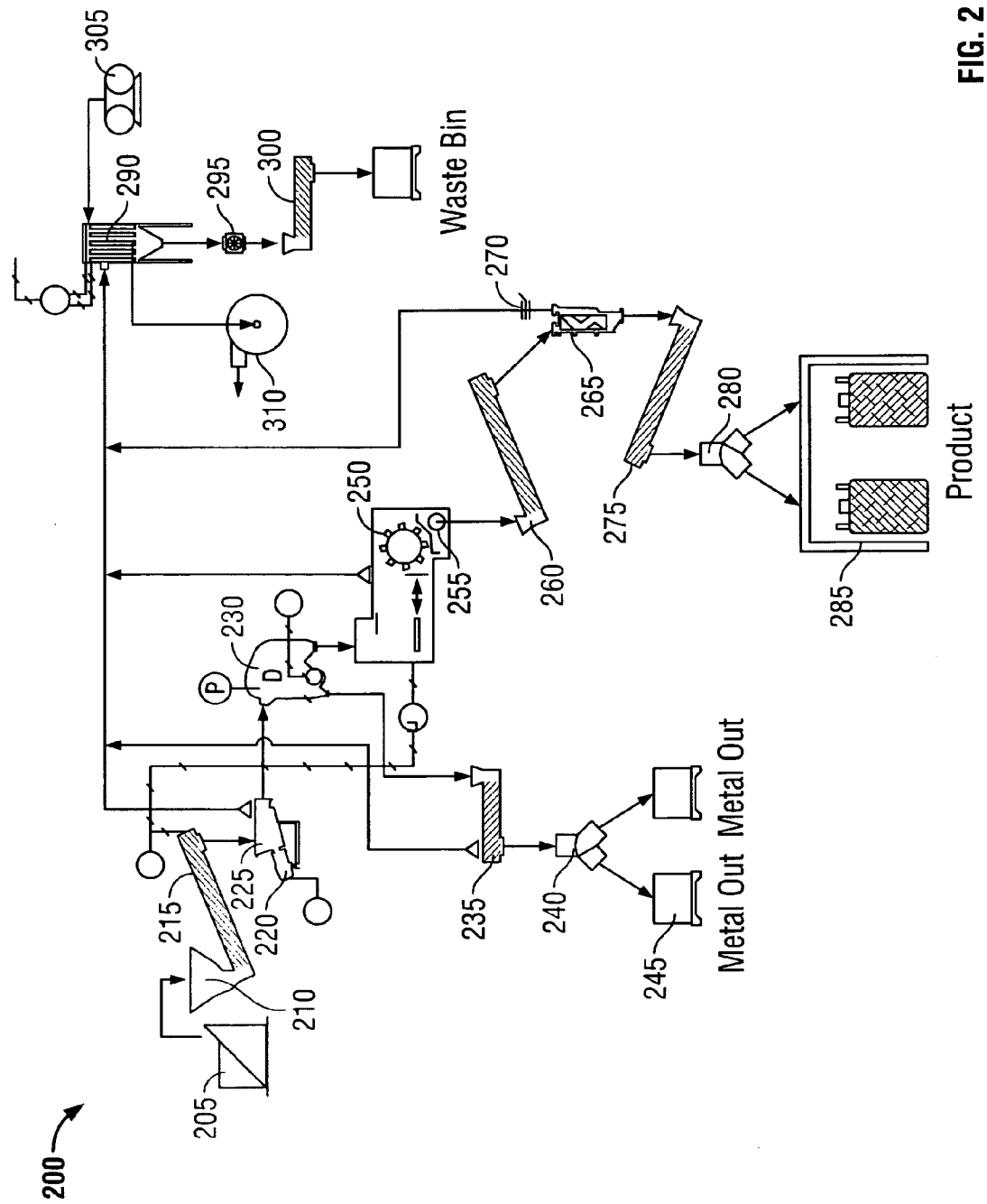
FIG. 2 is a schematic of an alternative implementation of the equipment configuration.

Auger 150, located at the bottom of cyclone 145, can require a hinged end-plate at its discharge to reduce air intake through the auger, which can otherwise tend to blow the light material out of the auger and back into cyclone 145. The hinged end-plate is pulled closed by the negative pressure and when material builds up at the discharge of auger 150, the material pushes the hinge open, which allows the material to exit. Fan 155 draws on cyclone 145 providing additional suction to evacuate feed vibrator 110 and grinder 125. The fan discharge can have a diversion leg that delivers a portion of the air to dust collector 160. Since only a portion of the air is sent to the dust collector, the size of the collector can be kept at a minimum. The fan discharge can send air to the lower air inlet of air leg separator 120, so that the air enters the vertical An alternative implementation of an equipment configuration used in a transportable material separation system 200 is shown in FIG. 2. In this configuration, a box dumper 205 allows the system to be fed from large shipping boxes that are approximately one cubic yard. Receiving bin 210 receives the material and auger 215 (or a conveyor) removes the material. This unit can be speed controlled to control flow rate using a variable frequency drive 220. The material is delivered to vibratory feeder 225, which spreads the material and provides a single layer where the individual pieces of the material are substantially free of one another to the first air aspirator or airleg 230. Aspirator 230 has its own dedicated fan to provide motive air to produce a rising air column. Air aspirator 230 removes metal and dense materials that are troublesome to grind and this material is sent out the bottom to an auger 235, through a diverter valve 240, and into one of two collection boxes 245. The light, plastic-rich material rises in air column of air aspirator 230 and reports to grinder 250. The ground material is transferred through augers 255 and 260 to a second air aspirator or air classifier 265 that removes the light material. Blast gate 270 controls this separation. Heavy plastic product reports out the bottom of air classifier 265 into auger 275 through diverter 280, and into one of two collection bags 285. The system includes a dust collector 290 with a rotary valve airlock 295 and a waste delivery auger 300 that delivers lights, fluff, foam and fines to a box. The dust collector 290 is supplied with an air compressor 305 for cleaning and purging the filters. A dedicated fan is provided for the dust collection system 310, and can also be used for air classifier 265. Dust is collected from various points in the process to maintain cleanliness.

Figure 3:
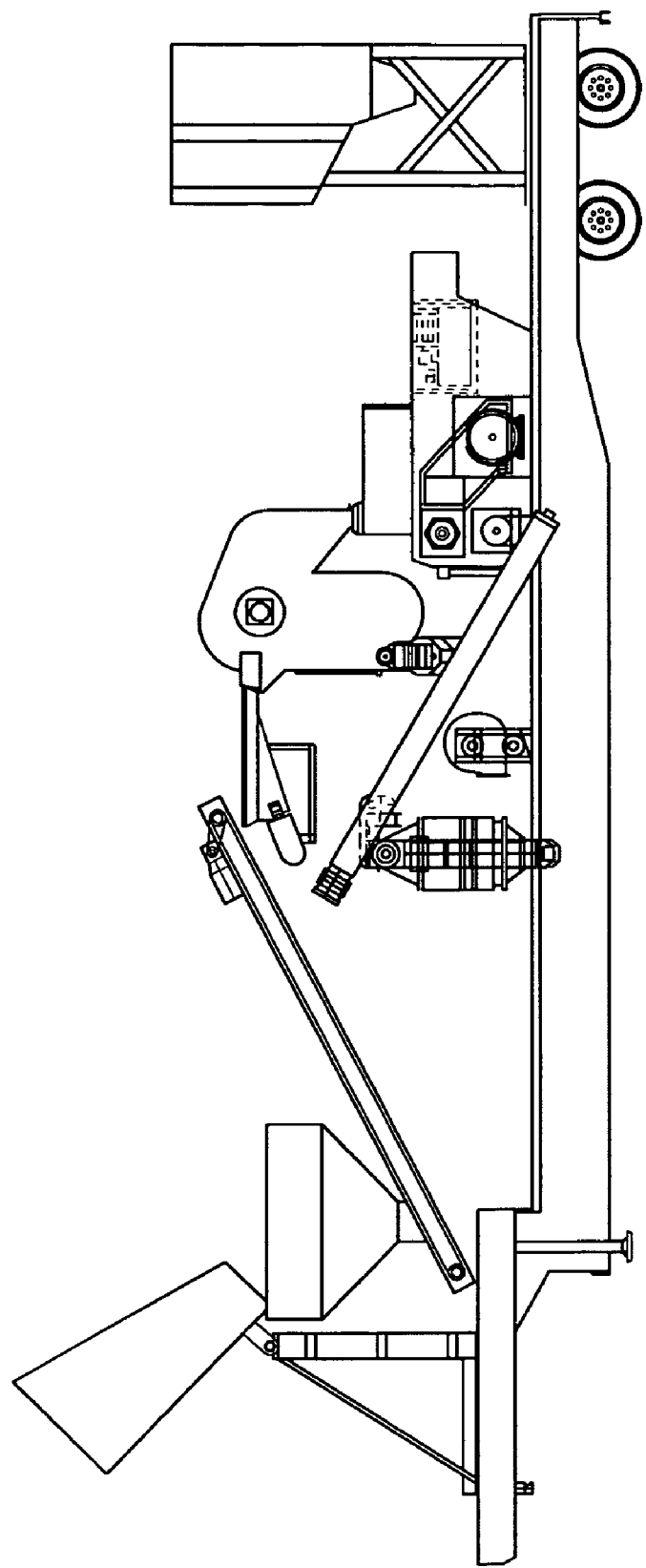
FIG. 3 shows a representation of one of the implementations on a transportable platform.
Figure 4:
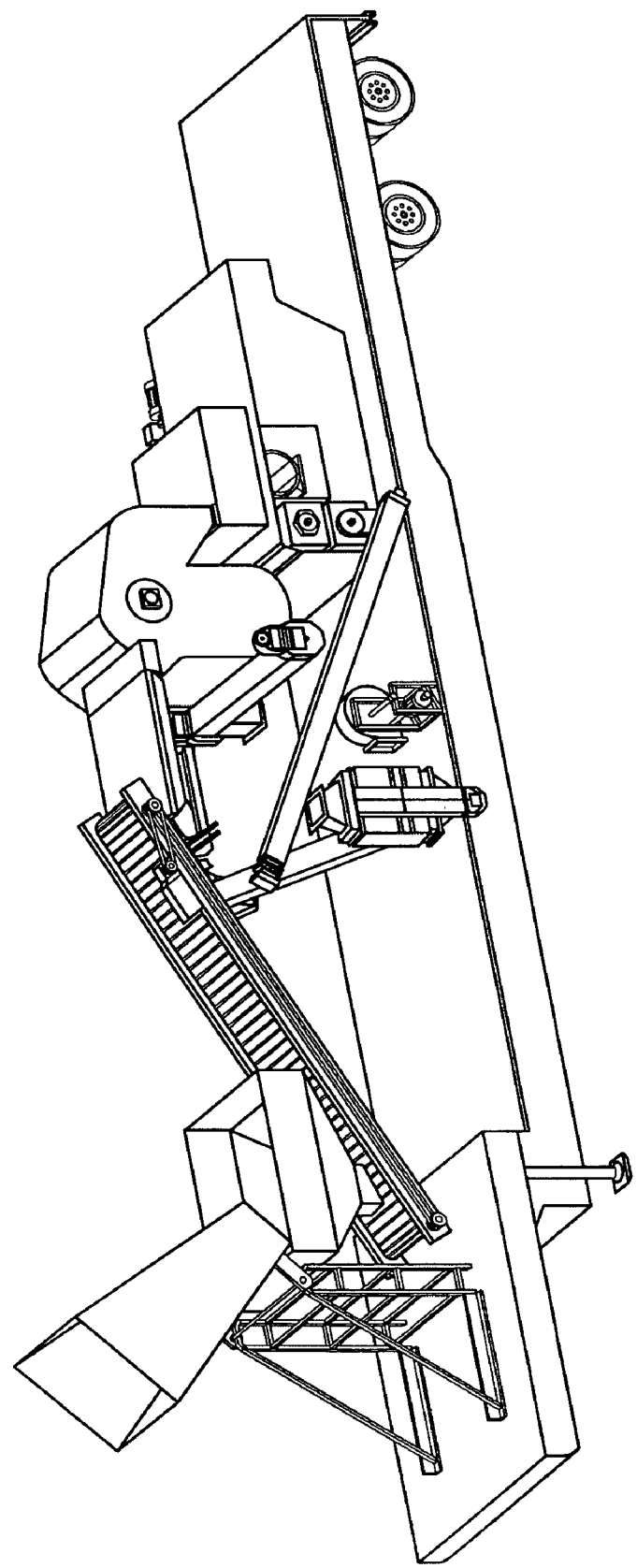
FIG. 4 is an alternative view of one of the implementations on a transportable platform.
Figure 5:
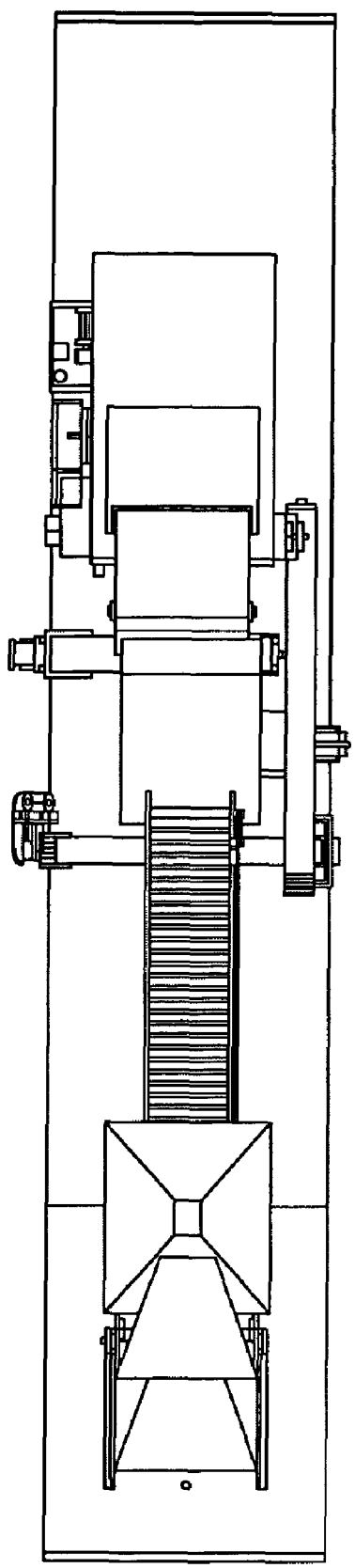
FIG. 5 is an overhead view of the transportable platform with equipment for processing mixed materials.

FIGS. 3-5 show various views of the implementation described in FIG. 2 when mounted on a platform for transporting the system.

Other equipment configurations can be included in the transportable system. The configurations described above are merely examples of potential equipment configurations.

EXAMPLES

The following examples, which demonstrate the effectiveness of the system at removing metal and at increasing the bulk density of shredded plastic-rich material, are illustrative only and are not intended to limit the scope of the invention described in the claims.

Example 1

Metal Removal Using Air Aspiration and Grinding System

Plastic-rich shredded materials from printer cartridges and from appliances both contained significant amounts of metal. These two streams were separately processed through an air-leg separator manufactured by American International Manufacturing Company (Woodland, Calif.) followed by size reduction in a rotary grinder.

Table 1 shows the percent of metal in each stream that was rejected to the heavy stream of the air-leg separator and the percent of total plastic that was lost during the processing. For both streams, the air-leg separator removed most of the metal without a significant loss of plastic.

TABLE 1

Air aspiration removal of metal and plastic loss in grinding and aspiration device

|  | printer cartridges | appliances |
|---|---|---|
| % of total metal rejected | 83.7 | 64.3 |
| % of total plastic lost | 4.8 | 1.7 |

Example 2

Removal of Large Metal Pieces Using Air Aspiration

Coarsely shredded plastic-rich material from appliances was processed through an air-leg separator. The separator was tuned to remove nearly all of the large metal (defined as larger than 25 mm in any dimension) that might be harmful to grinding while minimizing the loss of plastic.

Table 2 shows the effectiveness of removing large and small metal pieces. The data show that nearly all of the large metal was removed while removing only a small fraction of small metal and very little of the total plastic.

TABLE 2

Large and small metal removal in grinding and aspiration device for coarsely shredded appliance material.

| % large metal in total metal | 66.3 |
|---|---|
| % of total metal rejected to "heavies" | 56.6 |
| % of large metal rejected to "heavies" | 92.5 |
| % of small metal rejected to "heavies" | 28.9 |
| % of total plastic lost to "heavies" | 3.8 |

Example 3

Air Aspiration Followed by Grinding to Increase the Bulk Density

A coarsely shredded plastic-rich material from appliances was first separated into "light" and "heavy" streams using an air-leg separator. The "light" material was passed through a grinder with a 25.4 mm (one inch) screen.

Table 3 shows the bulk densities of the feed, "heavy" byproduct and ground "light" product. Bulk densities were calculated by weighing the amount of material in boxes and determining the volume by measuring the height of the material filling the boxes. The feed in this case did not contain a significant portion of fluff and fines, so no bulk density change would be expected from an air aspiration stage following grinding. The ground "light" product had a significantly higher bulk density than either the feed or the "heavy" byproduct.

TABLE 3

Bulk densities of plastic-rich material from appliances

| stream | bulk density (kg/m$^3$) |
|---|---|
| feed | 331 |
| "heavy" byproduct | 352 |
| ground "light" product | 456 |

The "heavy" fraction from the air-leg is enriched in metal, rubber, circuit boards, thick and dense plastics. The thick and dense plastics are also often glass filled, which is frequently less desirable as a feed for a plastic recovery facility.

Also many plastic-rich streams found at metal shredding operations have been observed to contain up to 40% by weight or more of foam. This foam takes up such a large fraction of the total volume that it is very expensive to ship the plastic-rich product.

The invention has been described in terms of particular embodiments. Other embodiments are within the scope of the following claims. For example, the various devices of the system can be arranged in a different order and still achieve desirable results.

What is claimed is:

1. A system for processing materials in a waste stream, comprising:
    an arrangement of separators and a grinder, the separators and grinder being configured in the arrangement to produce three or more product streams from a plastic-rich feed mixture, wherein the plastic-rich feed mixture includes plastic and metal from automobiles, appliances or electronics and with an average particle size from 10 mm to 200 mm and the product streams include a coarse heavy stream, a ground plastic-rich product stream, and at least one ground light material stream;
    wherein the arrangement comprises:
        an air-leg separator as one of the separators separating metal materials from the plastic-rich feed mixture, wherein the air-leg separator is configured to receive the plastic-rich feed mixture and to entrain light materials and allow heavy materials to fall through the air-leg separator,
        the grinder in operable communication with the air-leg separator such that at least a portion of a plastic material exiting the separator enters the grinder,
        a subsequent separator as one of the separators in operable communication with the grinder, the subsequent separator being configured to receive a ground material stream from the grinder and to separate at least one ground light material stream from the ground material; and
        a metal reprocessing apparatus for reprocessing the metal materials derived from the heavy stream.

2. The system of claim 1, wherein the subsequent separator uses air to separate the ground light material stream.

3. The system of claim 1, further comprising
    an auger or feeder configured to receive a product stream from the air-leg separator, the grinder or the subsequent separator.

4. The system of claim 1, further comprising one or more fans configured to push or pull material through the system.

5. The system of claim 1, wherein the air-leg separator separates the metal materials and thicker plastics from the plastic-rich feed mixture by separating heavier or thicker materials from lighter or thinner materials.

6. The system of claim 1, wherein the arrangement of separators and a grinder are mounted on a transportable platform.

7. The system of claim 6, wherein the platform is included in an enclosure housing the arrangement.

8. The system of claim 6, wherein the platform is included in a shipping container, a truck trailer or a railroad car.

9. The system of claim 1, further comprising a computerized control system to adjust one of feed, grinding or fan rates.

10. The system of claim 9, wherein the computerized control system automatically monitors the feed, grinding or fan rates and makes adjustments.

11. The system of claim 9, wherein the computerized control system remotely monitors use of one or more of the devices in the arrangement.

12. The system of claim 1, further comprising one of a magnet, a metal detector or an eddy current device for recovering metal from the heavy stream.

13. A method of processing a plastic-rich mixture, comprising:
receiving at a waste-goods location at least a portion of a separation system including an arrangement of separation and grinding devices;
operating the system to process a plastic-rich feed mixture including plastic and metal from automobiles, appliances or electronics and with an average particle size from 10 mm to 200 mm to produce at least three product streams, the product streams including a coarse and/or heavy stream, a ground plastic-rich product stream, and at least one ground light material stream, wherein operating the system comprises
feeding the plastic-rich feed mixture into an air-leg separator to separate the metal materials from the plastic-rich feed mixture and to form the coarse and/or heavy stream,
followed by grinding at least a portion of a plastic material exiting the air-leg separator in a grinder to form a ground material,
followed by sending the ground material from the grinder into a second separator to separate the at least one ground light material stream and the ground plastic-rich product stream from the ground material; and
reprocessing the metal materials from the coarse and/or heavy stream.

14. The method of claim 13, wherein
the devices of the system remain mounted on a transportable platform throughout the receiving and operating steps.

15. The method of claim 13, further comprising
transporting the ground plastic-rich product stream to a plastic recovery facility.

16. The method of claim 13, wherein the receiving step includes receiving the air-leg separator, the grinder and the second separator on a transportable platform.

17. A method for processing a mixture, comprising:
moving air in an air-leg separation device;
adding a mixture of plastics and metals to the air-leg separation device, wherein the plastics and metals are from automobiles, appliances or electronics and have an average particle size from 10 mm to 200 mm and the moving air entrains light or thin materials in the mixture and allows heavier or thicker components to fall within the separation device;
collecting the heavier or thicker components that have fallen within the separation device, including collecting the metals;
from the air-leg separation device, collecting the light or thin materials separately from the heavier or thicker components;
after collecting the light or thin materials, sending the light or thin materials to a grinder; and
reprocessing the metals collected in the step of collecting the heavier or thicker components.

18. The method of claim 17, wherein collecting the light or thin materials includes collecting a plastic-enriched product, which has a higher percentage of plastic than the mixture.

19. The method of claim 17, wherein collecting the heavier or thicker components includes collecting a rubber-enriched product, which has a higher percentage of rubber than the mixture.

20. The method of claim 17, wherein collecting the heavier or thicker components includes collecting a dense plastic-enriched product, which has a higher percentage of dense and thick plastic as compared to plastics collected in the light or thin material.

21. A method for separating a mixture, comprising:
adding a waste mixture containing shredded plastics and metals from automobiles, appliances or electronics and having an average particle size from 10 mm to 200 mm to an air-leg separator, wherein moving air within the air-leg separator entrains light components in the mixture and allows heavy or thick components to fall within the air-leg separator;
collecting a mixture of the heavy or thick components, wherein the mixture of the heavy or thick components is enriched in the metals; and
collecting a mixture of the light or thin components separately from the heavy or thick components, wherein the mixture of the light or thin components includes a lower fraction of the metals than the waste mixture.

22. The method of claim 21, wherein the waste mixture includes rubber and the mixture of the heavy or thick components includes a higher fraction of the rubber than the waste mixture.

23. The method of claim 21, wherein:
the waste mixture includes dense and thick plastics and thin and less dense plastics,
the mixture of the light components includes a higher fraction of the thinner and less dense plastics than the waste mixture; and
the mixture of the heavier components includes a higher fraction of the dense and thick plastics than the waste mixture.

24. The method of claim 21, wherein collecting the heavier or thicker components that have fallen within the separation device collects a product enriched in metal, rubber and thick and dense plastics as compared to the mixture of plastics, in a single processing step.

* * * * *